US010694067B2

(12) United States Patent
Toscano et al.

(10) Patent No.: US 10,694,067 B2
(45) Date of Patent: *Jun. 23, 2020

(54) ON NET FAXING (71) Applicant: Open Text Holdings, Inc., San Mateo, CA (US)

(72) Inventors: Francis Toscano, Kendall Park, NJ (US); Samuel N. Kamens, Highland Park, NJ (US)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/830,594

(22) Filed: Dec. 4, 2017

(65) Prior Publication Data
US 2018/0091693 A1    Mar. 29, 2018

Related U.S. Application Data

(63) Continuation of application No. 14/172,452, filed on Feb. 4, 2014, now Pat. No. 9,854,123, which is a
(Continued)

(51) Int. Cl.
*H04N 1/23* (2006.01)
*G06Q 30/02* (2012.01)
(Continued)

(52) U.S. Cl.
CPC ............. *H04N 1/23* (2013.01); *G06Q 10/08* (2013.01); *G06Q 30/0207* (2013.01); *G06Q 30/04* (2013.01)

(58) Field of Classification Search
CPC ...... H04N 1/23; G06Q 10/08; G06Q 30/0207; G06Q 30/04
(Continued)

(56) References Cited

U.S. PATENT DOCUMENTS 4,187,520 A    2/1980 Beduchaud et al.
4,764,951 A    8/1988 Kotani et al.
(Continued)

FOREIGN PATENT DOCUMENTS

EP    0 944 233    9/1999
EP    1 083 732    3/2001
(Continued)

OTHER PUBLICATIONS

International Search Report issued for PCT Application No. PCT/US2009/056229, dated Dec. 10, 2010, 2 pages.
(Continued)

*Primary Examiner* — Vanel Frenel
(74) *Attorney, Agent, or Firm* — Sprinkle IP Law Group (57) ABSTRACT

Distribution of electronic documents is described, including receiving an electronic document to be distributed, identifying whether a destination identifier is associated with a destination account among a known group of customer accounts, routing the electronic document, and calculating a fee associated with delivery of the electronic document based on whether the destination account is among the known group of customers and a set of billing rules. The set of billing rules may specify a discounted fee for routing an electronic document to each of a known group of customer accounts. In other aspects, the set of billing rules may specify a discounted fee for routing an electronic document to a first group of the known group of customer accounts and specify a standard fee for a second group of the known group of customer accounts.

21 Claims, 5 Drawing Sheets

Related U.S. Application Data continuation of application No. 13/311,167, filed on Dec. 5, 2011, now Pat. No. 8,719,083.

(60) Provisional application No. 61/420,040, filed on Dec. 6, 2010.

(51) Int. Cl.
  *G06Q 30/04* (2012.01)
  *G06Q 10/08* (2012.01)

(58) Field of Classification Search
  USPC ............ 705/34, 30, 38; 358/468, 1.15, 1.18; 382/112, 284, 305; 707/999.101; 709/206; 370/490, 352
  See application file for complete search history.

(56) References Cited

U.S. PATENT DOCUMENTS

| | | | |
|---|---|---|---|
| 5,222,211 A | 6/1993 | Mueller et al. | |
| 5,291,302 A | 3/1994 | Gordon et al. | |
| 5,367,619 A | 11/1994 | Dipaolo et al. | |
| 5,375,176 A | 12/1994 | Spitz | |
| 5,386,298 A | 1/1995 | Bronnenberg et al. | |
| 5,434,775 A | 7/1995 | Sims et al. | |
| 5,563,998 A | 10/1996 | Yaksich et al. | |
| 5,664,185 A | 9/1997 | Landfield et al. | |
| 5,675,507 A | 10/1997 | Bobo, II | |
| 5,991,469 A | 11/1999 | Johnson et al. | |
| 6,020,980 A | 2/2000 | Freeman | |
| 6,266,160 B1* | 7/2001 | Saito | H04L 51/066 358/1.15 |
| 6,356,356 B1 | 3/2002 | Miller, Jr. et al. | |
| 6,396,848 B1* | 5/2002 | Ohta | H04L 29/06 370/352 |
| 6,972,858 B1 | 12/2005 | Nishida et al. | |
| 6,981,023 B1 | 12/2005 | Hamilton et al. | |
| 6,985,494 B2 | 1/2006 | Thompson | |
| 7,509,648 B1 | 3/2009 | Afshar et al. | |
| 7,613,280 B1 | 11/2009 | Lunde et al. | |
| 7,620,177 B2 | 11/2009 | Ibrahim et al. | |
| 7,904,811 B2 | 3/2011 | Saito | |
| 8,719,083 B2 | 5/2014 | Toscano et al. | |
| 9,854,123 B2 | 12/2017 | Toscano et al. | |
| 2002/0054367 A1 | 5/2002 | Tsuchiya | |
| 2002/0099456 A1 | 7/2002 | McLean | |
| 2002/0133516 A1 | 9/2002 | Davis et al. | |
| 2002/0165822 A1 | 11/2002 | Makipaa | |
| 2003/0093322 A1 | 5/2003 | Sciuk | |
| 2003/0112472 A1 | 6/2003 | Eguchi et al. | |
| 2003/0187939 A1 | 10/2003 | O'Brien | |
| 2003/0233414 A1 | 12/2003 | Henry | |
| 2003/0233467 A1 | 12/2003 | Ogasawara | |
| 2004/0150157 A1 | 8/2004 | Meade, II | |
| 2004/0186895 A1 | 9/2004 | Ellis | |
| 2005/0024675 A1 | 2/2005 | Konno | |
| 2005/0134903 A1 | 6/2005 | Tanimoto et al. | |
| 2005/0141485 A1 | 6/2005 | Miyajima et al. | |
| 2005/0179961 A1* | 8/2005 | Czyszczewski | H04N 1/00411 358/468 |
| 2005/0188226 A1 | 8/2005 | Kasatani | |
| 2006/0026597 A1 | 2/2006 | Sakou | |
| 2006/0044598 A1 | 3/2006 | Etelapera | |
| 2006/0136371 A1 | 6/2006 | Yuan et al. | |
| 2006/0277141 A1 | 12/2006 | Palmer | |
| 2006/0291453 A1 | 12/2006 | Kuwahara | |
| 2007/0011362 A1 | 1/2007 | Umekage et al. | |
| 2007/0106904 A1 | 5/2007 | Christoff et al. | |
| 2007/0115512 A1 | 5/2007 | Noel et al. | |
| 2007/0198560 A1* | 8/2007 | Foygel | G06Q 10/10 |
| 2007/0247661 A1 | 10/2007 | Minami et al. | |
| 2007/0255628 A1 | 11/2007 | Takahashi et al. | |
| 2008/0089327 A1 | 4/2008 | Lu et al. | |
| 2008/0133411 A1 | 6/2008 | Jones et al. | |
| 2008/0183754 A1 | 7/2008 | Kitada | |
| 2008/0263071 A1 | 10/2008 | Ferlitsch et al. | |
| 2009/0025078 A1 | 1/2009 | Kuehr-McLaren et al. | |
| 2009/0164881 A1 | 6/2009 | Segarra et al. | |
| 2009/0182630 A1 | 7/2009 | Otto et al. | |
| 2009/0210383 A1 | 8/2009 | Seemann | |
| 2009/0244638 A1 | 10/2009 | Evevsky | |
| 2009/0300380 A1 | 12/2009 | Vojak et al. | |
| 2010/0042523 A1 | 2/2010 | Henry et al. | |
| 2010/0082981 A1 | 4/2010 | Church et al. | |
| 2011/0099105 A1 | 4/2011 | Mennie et al. | |
| 2012/0136777 A1 | 5/2012 | Hanson | |
| 2014/0177001 A1 | 6/2014 | Meyers et al. | |

FOREIGN PATENT DOCUMENTS

| | | |
|---|---|---|
| JP | 2002-9976 | 1/2002 |
| JP | 2003-219128 | 7/2003 |
| JP | 2005-244794 | 9/2005 |
| KR | 2003-0056621 | 7/2003 |
| KR | 10-2006-0112501 | 11/2006 |
| WO | WO 01/60050 | 8/2001 |
| WO | WO 2006/089223 | 8/2006 |
| WO | WO 2009/032872 | 3/2009 |
| WO | WO 2010/030601 | 3/2010 |
| WO | WO 2012/078585 | 6/2012 |

OTHER PUBLICATIONS

International Search Report issued for PCT Application No. PCT/US2008/075173, dated Mar. 20, 2009, 2 pages.

Utano et al., Use of Facsimile Technology in Document Delivery Systems, prepared for Commerce, Energy, NASA, National Library of Medicine and Defense Information Managers, Mar. 1992, 59 pages, Integrated Computer Systems, Inc., Oak Ridge, TN, US.

Extended European Search Report for European Patent Application No. 08799129.5, dated Nov. 17, 2011, 8 pages.

International Search Report and Written Opinion issues for PCT Application No. PCT/US2011/063450, dated Jul. 24, 2012, 8 pages.

International Preliminary Report on Patentability (IPRP) issued for PCT Application No. PCT/US2011/063450, dated Jun. 20, 2013, 5 pages.

Written Opinion issued for PCT Application No. PCT/US2009/056229, dated Dec. 10, 2010, 5 pages.

International Preliminary Report on Patentability (IPRP) issued for PCT Application No. PCT/US2009/056229, dated Mar. 24, 2011, 7 pages.

Written Opinion issued for PCT Application No. PCT/US2008/075173, dated Mar. 20, 2009, 6 pages.

International Preliminary Report on Patentability (IPRP) issued for PCT Application No. PCT/US2008/075173, dated Mar. 9, 2010, 7 pages.

Office Action issued for U.S. Appl. No. 13/311,167, dated Jul. 3, 2013, 9 pages.

Office Action issued for U.S. Appl. No. 14/172,452, dated Mar. 13, 2015, 13 pages.

Office Action issued for U.S. Appl. No. 14/172,452, dated Aug. 21, 2015, 7 pages.

Office Action issued for U.S. Appl. No. 14/172,452, dated Jun. 1, 2016, 8 pages.

Office Action issued for U.S. Appl. No. 14/172,452, dated Dec. 30, 2016, 13 pages.

* cited by examiner

ON NET FAXING

CROSS-REFERENCE TO RELATED APPLICATIONS

This application is a continuation of, and claims a benefit of priority under 35 U.S.C. 120 of the filing date of, U.S. patent application Ser. No. 14/172,452, filed Feb. 4, 2014, entitled "ON NET FAXING," which is a continuation of, and claims a benefit of priority under 35 U.S.C. 120 of the filing date of, U.S. patent application Ser. No. 13/311,167, filed Dec. 5, 2011, now U.S. Pat. No. 8,719,083, entitled "ON NET FAXING," which is a conversion of, and claims a benefit of priority from, U.S. Provisional Application No. 61/420,040, filed Dec. 6, 2010. All applications listed in this paragraph are hereby incorporated herein by reference for all purposes.

BACKGROUND

Conventional facsimile (fax) technology has been a successful means to transmit documents electronically. However, with the emergence of data networks, the integration of conventional fax technology with data networks has changed the landscape of fax services. Particularly, a fax which was typically communicated exclusively via the circuit-switched Public Switched Telephone Network ("PSTN") is now commonly communicated via portions of both the PSTN and packet-switched data networks. Additionally, new network-based fax services are available which permit a user to originate a fax message to be delivered from various types of clients connected to packet-switched data networks. As network-based fax services are adopted by more and more users, it may become common that a party that subscribes to a network-based fax service transmits a fax to another party that also subscribes to the same network-based fax service. In other words, as network-based fax services become more and more popular, there is an increased likelihood that both originating and destination parties of a fax would be customers of a same network-based fax service.

Generally, a network-based fax service may be implemented by a server including packet- and circuit-switched interface circuits, as well as hardware and associated software for converting electronic documents for users. When an electronic document arrives at the server for delivery as a fax, the server may convert the document into a format suitable for transmission over the PSTN. The fax server may then transmit the converted document over the PSTN via circuit-switched interface circuits and/or an associated gateway. For a fax arriving at the server, the server may identify a destination account associated with the arriving fax, convert the incoming fax into a format suitable for delivery to the destination account, and store the converted document for retrieval over the packet-switched network.

Between two customers that both subscribe to the same network-based fax service, it would be preferable to deliver a fax without relying upon the PSTN. In this case, costs associated with delivery of the fax may be reduced, because the PSTN is not used. It is noted that the network-based service may generally incur a cost from a telephone company or other entity for each fax delivered using the PSTN. However, for reasons discussed in further detail below, it may be undesirable for customers to be put on notice that the network-based fax service saves costs with respect to delivery of fax messages.

A network-based fax service that accounts for the above-described factors and conditions would be desirable.

SUMMARY

In one embodiment, a method for distributing documents is described including receiving an electronic document to be distributed and a destination identifier, identifying whether the destination identifier is associated with a destination account among a known group of customer accounts, routing the electronic document according to whether the destination account is among the known group of customer accounts, and calculating a fee associated with delivery of the electronic document based on whether the destination account is among the known group of customers and a set of billing rules. In some aspects, identifying whether the destination account is among the known group of customers includes accessing a database of known customers. The electronic document may be received via one of an attachment to an e-mail, a web portal, and an application programming interface, for example, and the method may further include formatting the electronic document into a format suitable for facsimile transmission.

The set of billing rules may specify a discounted fee for routing an electronic document to each of a known group of customer accounts. In other aspects, the set of billing rules may specify a discounted fee for routing an electronic document to a first group of the known group of customer accounts and specify a standard fee for a second group of the known group of customer accounts.

In some aspects, routing an electronic document may include, when a destination account is among a known group of customer accounts, routing the electronic document via a port of a gateway configured as a logical crossover connection between inbound and outbound interfaces. In other embodiments, routing the electronic document may include, when the destination account is not among the known group of customers, routing the electronic document via a port of a gateway configured as a logical connection to an external communications network.

In some embodiments, the method may further include identifying an originating account associated with an electronic message, and determining whether originating and destination accounts are each associated with a same customer, where, when the originating and destination accounts are each associated with the same customer, the calculating further comprises calculating a discounted or standard fee for routing the electronic document based on a subset of the billing rules associated with the customer. The method may further include identifying an originating account associated with the electronic message, and determining whether originating and destination accounts are associated with different customers, where, when the originating and destination accounts are associated with different customers, the calculating further comprises calculating a discounted or standard fee for routing the electronic document based on a subset of the billing rules associated with different customers.

In another embodiment, an apparatus for distributing documents is described, including a customer database that stores a known group of customers, a billing database that stores a set of billing rules, a network interface configured to receive an electronic document to be distributed and a destination identifier, a job monitor configured to identify whether the destination identifier is associated with a destination account among the known group of customer accounts, and route the electronic document according to whether the destination account is among the known group of customer accounts, and a billing controller configured to calculate a fee associated with delivery of the electronic document based on whether the destination account is among the known group of customer accounts and the set of billing rules. In some aspects, the electronic document is received by the network interface via one of an attachment to an e-mail, a web portal, and an application programming interface, for example, and the apparatus further comprises a document translator that formats the electronic document into a format suitable for facsimile transmission. In other aspects, the job monitor is further configured to route the electronic document via a port of a gateway configured as a logical crossover connection between inbound and outbound interfaces, when the destination account is among the known group of customer accounts. The job monitor may be further configured to route the electronic document via a port of a gateway configured as a logical connection to an external communications network, when the destination account is among the known group of customer accounts.

The set of billing rules may specify a discounted fee for routing an electronic document to each of a known group of customer accounts. In other aspects, the set of billing rules may specify a discounted fee for routing an electronic document to a first group of the known group of customer accounts and specify a standard fee for a second group of the known group of customer accounts.

In some aspects, a job monitor of an apparatus for distributing documents may be configured to identify an originating account associated with the electronic message, and determine whether the originating and destination accounts are each associated with a same customer, and a billing controller of the apparatus for distributing documents may be configured to calculate a discounted or standard fee for routing the electronic document based on a subset of the billing rules associated with the customer, when the originating and destination accounts are each associated with the same customer. In other aspects, a job monitor of an apparatus for distributing documents may be further configured to identify an originating account associated with the electronic message, and determine whether the originating and destination accounts are associated with different customers, and a billing controller of the apparatus for distributing documents may be configured to calculate a discounted or standard fee for routing the electronic document based on a subset of the billing rules associated with different customers, when the originating and destination accounts are associated with different customers.

In still another embodiment, a system for distributing documents is described including a gateway communicatively coupled to an external communications network and comprising inbound and outbound line controllers, a first port of the gateway being configured as a logical crossover connection between the inbound and outbound line controllers and a second port of the gateway being configured as a logical connection to the external communications network, a job monitor configured to receive an electronic document to be distributed and a destination identifier, identify whether the destination identifier is associated with a destination account among the known group of customer accounts, and route the electronic document via the gateway according to whether the destination account is among the known group of customer accounts, and a billing controller configured to calculate a fee associated with delivery of the electronic document based on whether the destination account is among the known group of customer accounts and a set of billing rules.

BRIEF DESCRIPTION OF THE DRAWINGS

For a more complete understanding of the invention and the advantages thereof, reference is now made to the following description, in conjunction with the accompanying figures briefly described as follows.

DETAILED DESCRIPTION

In the following paragraphs, the invention is described in detail by way of example with reference to the attached drawings. Embodiments are described with the understanding that the present disclosure is to be considered as an example of the principles of the invention and not intended to limit the invention to the specific embodiments shown and described. That is, throughout this description, the embodiments and examples are to be considered as exemplars, rather than as limitations. Descriptions of well-known components, methods, and/or processing techniques are omitted so as not to unnecessarily obscure the invention. As used herein, the "invention" refers to any of the embodiments of the invention described herein, and any equivalents. Further, reference to various feature(s) of the invention is not to suggest that every embodiment must include the referenced feature(s).

In some aspects and embodiments, the invention may be implemented as a computer program executed on a processor. However, it should be apparent that there could be many different ways of implementing the invention in a computer program, and the invention should not be construed as being limited to any particular set of computer program instructions. Further, as a skilled programmer would be able to write a computer program to implement embodiments of the invention based on the flow charts and associated descriptions provided herein, specific disclosure of program code instructions is not considered necessary for an adequate understanding of how to make and use the invention.

The invention is directed to distributing electronic documents as faxes, for example, using an approach that saves costs associated with delivering faxes over the PSTN, by routing messages identified as being associated with destination accounts among a known group of customers using a logical crossover connection that bypasses the PSTN. Additionally, the invention relies upon a set of billing rules to define and specify either discounted or standard fees for delivery of faxes.

As noted above, between two customers that both subscribe to the same network-based fax service, it is possible to deliver a fax between the customers without relying upon the PSTN. In this case, costs associated with delivery of the fax may be discounted, because the PSTN is not used. Although costs associated with distributing a fax may be discounted, it may be desirable if customers are unaware of the fact that the PSTN is bypassed. For example, a network-based fax service may desire to bypass the PSTN to save costs, while still charging a standard fax delivery fee. In some situations, it may be preferable that customers are unaware that faxes are being delivered via only the data network and not the PSTN, because the customers are more likely to demand a discounted fee. In other situations, it may be preferable that customers are unaware that faxes are delivered via only the data network and not the PSTN, because such delivery may indicate to the customers that they are both serviced by the same network-based fax service. Especially between two customers of competing business practices, it may be undesirable for the customers to take notice that they are each subscribing to the same network-based fax service.

The invention takes the above-described factors and conditions into account. In general, a received electronic document to be distributed as a fax is associated with a destination identifier that identifies a destination for faxing the electronic document. Based on the destination identifier, an account associated with the destination identifier may be identified as being among a known group of customer accounts that subscribe to a network-based fax service. Alternatively, the destination identifier may not be identified among the known group of customer accounts that subscribe to the network-based fax service. The electronic document may then be routed for distribution as a fax accordingly. After the electronic document is distributed (i.e., delivered), calculation of a fee associated with delivery of the electronic document may be determined based on whether the destination of the fax was among the known group of customers that subscribe to the network-based fax service and a set of billing rules.

Among embodiments, the set of billing rules may specify a global discount among all accounts of one customer of the network-based fax service. Alternatively, the set of billing rules may specify specific discounts between respective accounts of one customer. In additional embodiments, the set of billing rules may specify global discounts between different customers of the network-based fax service, or specify specific discounts between respective accounts among different customers.

Routing electronic documents without relying upon the PSTN may be accomplished by a gateway configured to deliver the electronic documents as faxes using a logical crossover connection of the gateway. Using such a gateway, faxes may appear to have traversed the PSTN, without actually relying on the PSTN or being subject to the costs associated with the PSTN. Further, according to features described herein, delivery of documents using the logical crossover connection is indistinguishable to customers of the network-based fax service from delivery of documents using the PSTN. Aspects of the invention include appending fax transmission headers and cover pages, among other information and items, to an electronic document delivered via the gateway, regardless of whether the delivery is via the logical crossover connection or the PSTN. As such, features such as transmission time, transmission date, and other well-known transmission identifiers generally available when delivering an electronic document as a fax via the PSTN are still provided even when delivering via the logical crossover connection. For this and other reasons described below, users are unable to distinguish delivery of the electronic document as a fax via the PSTN or the logical crossover connection of the gateway.

Turning now to the drawings, in which like numerals indicate like elements throughout, embodiments of the invention are described in further detail.

Figure 1:
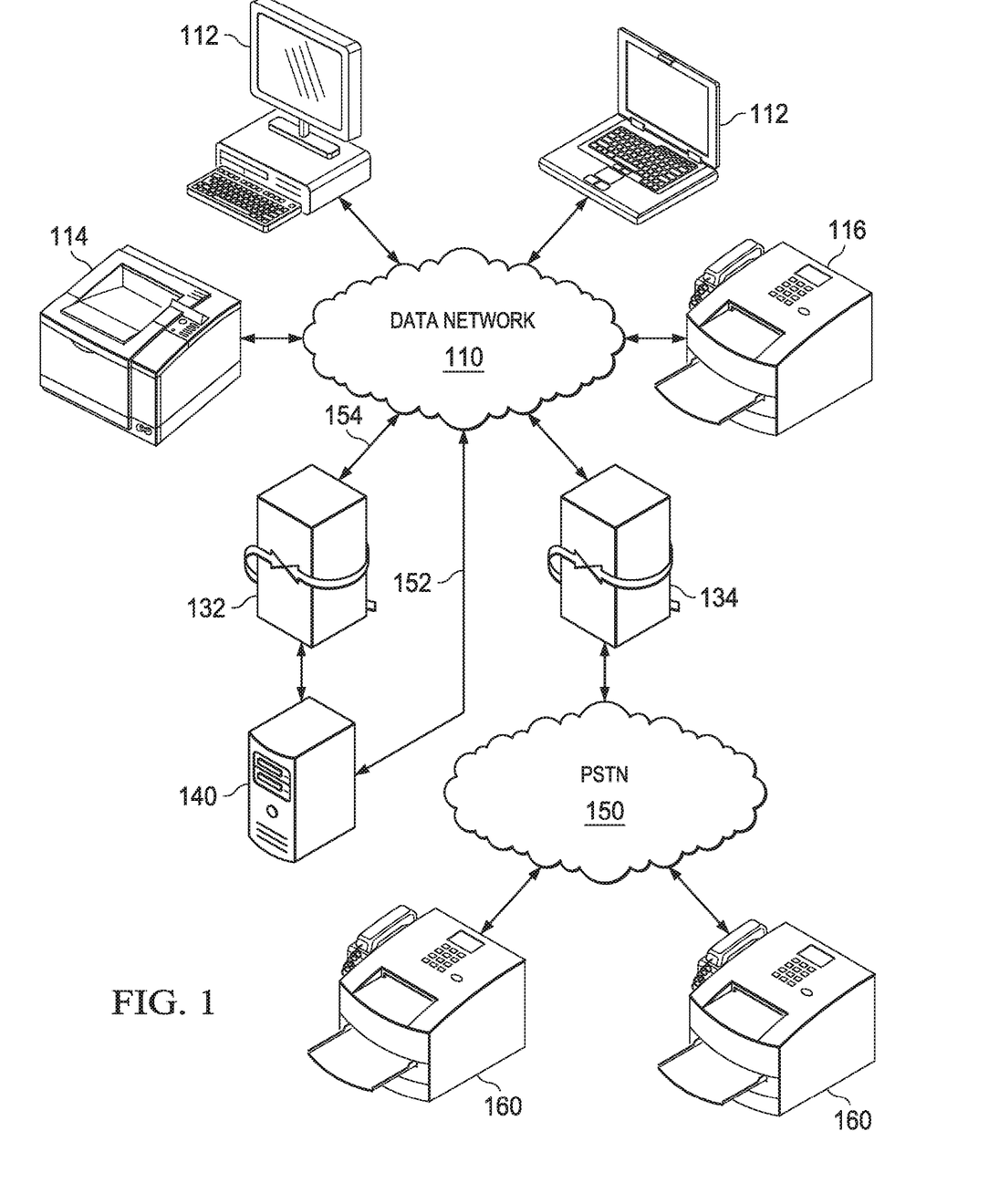
FIG. 1 illustrates an example network diagram according to aspects described herein.

FIG. 1 illustrates an example network diagram. The network includes data network 110 and the PSTN 150. The data network 110 may comprise a public, private, or public and private packet-switched data network, including one or more Local Area Networks (LANs), Wide Area Network (WANs), and the Internet. The PSTN 150 may comprise a public, private, or public and private circuit-switched telephone network.

Several clients or terminals are connected to the data network 110, such as computers 112, multi-function device 114, and network fax machine 116. The computers 112, multiple-function device 114, and network fax machine 116 may each be connected to the data network 110 in any manner understood by those of ordinary skill and the art. For example, connections to the data network may be via intermediary networks and/or Internet Service Providers (ISPs). Likewise, the multi-function device 114 and the network fax machine 116 may be connected to the data network via intermediary networks and/or ISPs. The data network 110 and any connections to the data network 110 may also include wired, wireless, and optical connections, among other well-known connections.

Conventional fax machines 160 are coupled to the PSTN 150 using standard telephone connections, as understood by those of ordinary skill in the art. The standard fax machines 116 may rely upon the T.30 fax protocol for transmission of faxes over the PSTN in the voice band of approximately 50-3500 Hz, as one example. The gateway 134 provides an interface between the data network 110 and the PSTN 150. For example, the gateway 134 may serve as an interface between packet-based protocols used on the data network 110 and protocols used on the PSTN 150, which is a circuit-switched network. In some aspects, the gateway 134 may permit real time communications between the standard fax machines 160 and devices connected to the data network 110, by converting protocols relied upon by the fax machines 160 (such as the T.30 protocol) to protocols suitable for transmission over the data network 110. The gateway 134 and the PSTN 150 may be maintained by a telephone company or other entity.

As a more detailed example of the functions performed by the gateway 134, the gateway 134 may be configured as a T.30/T.38 fax relay. That is, the gateway 134 may convert or encapsulate a T.30 protocol data stream into a T.38 protocol data stream, and vice versa. The T.38 protocol data stream is suitable for transmission over the data network 110. The T.38 data stream may be routed to another T.38 enabled end point device such as the multiple function device 114, the network fax machine 116, or the gateway 132. The T.38 protocol may reply upon signaling and setup protocols such as TCP, UDP, H.323, SIP, and MGCP, for example, to transport T.38 packets over the data network 110.

As described in further detail below, the gateway 132 may be configured to route electronic messages using a logical crossover connection that bypasses the PSTN 150, while permitting the appearance of transmission using the PSTN 150. In some aspects, the gateway 132 may also function as a T.30/T.38 fax relay. The server 140 is configured to receive electronic documents to be distributed, identify whether a destination associated with the electronic document is an account among a known group of customer accounts, route the electronic document according to whether the destination account is among the known group of customer accounts, and calculate a fee associated with delivery of the electronic document based on whether the destination account is among the known group of customers and a set of billing rules. It is noted that the server 140 may include more than one connection to the data network 110. According to the example illustrated in FIG. 1, the server 140 is communicatively coupled to the data network 110 via the direct network path 152 and via the gateway path 154 through the gateway 132.

Figure 2:
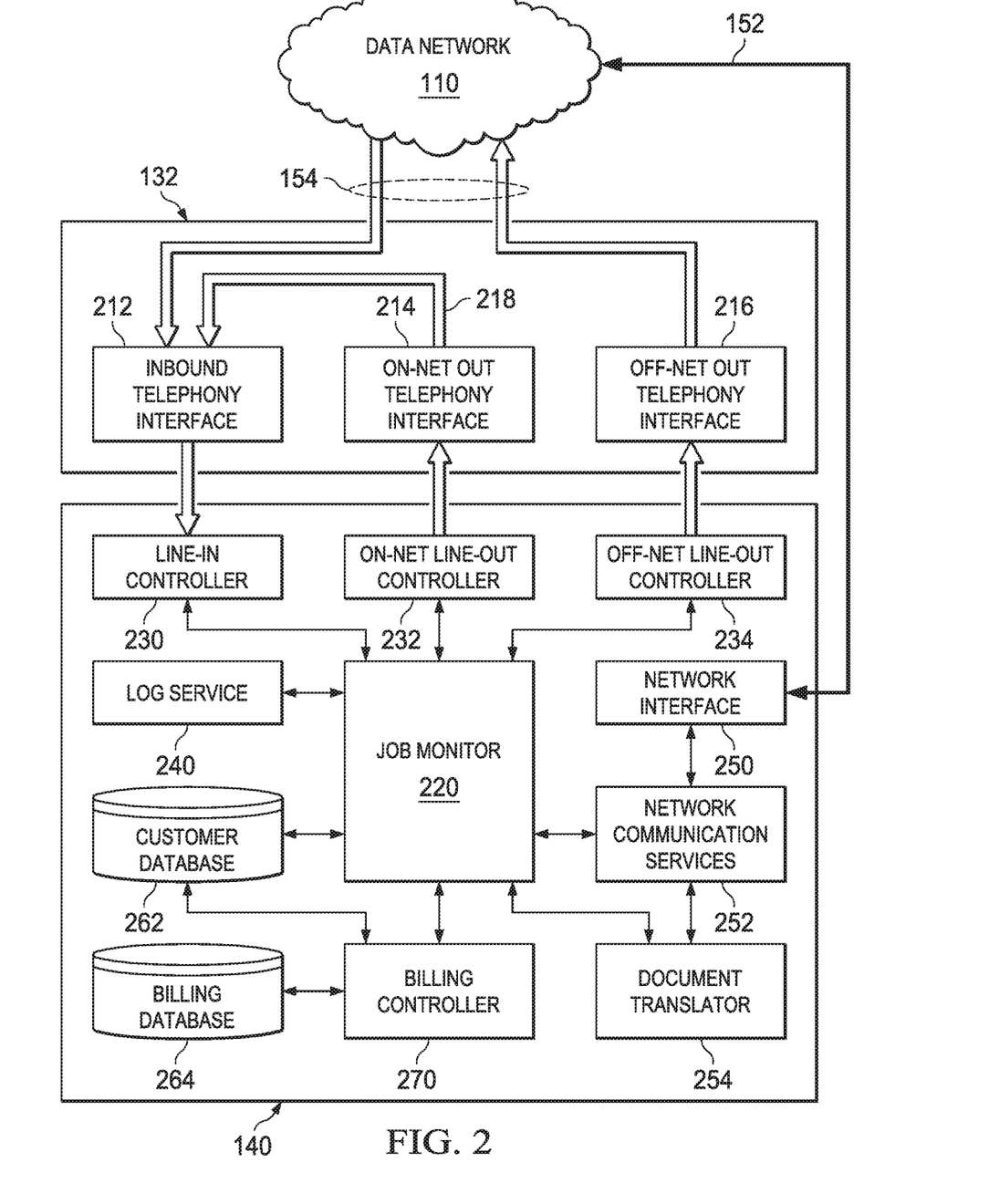
FIG. 2 illustrates an example functional block diagram of a gateway and a server according to aspects described herein.

Turning to FIG. 2, an exploded view of the gateway 132 and the server 140 is illustrated. The gateway 132 includes an inbound telephone interface 212, an on-net outbound telephony interface 214, and an off-net outbound telephony interface 216. The server 140 provides a network-based fax service and comprises various functional blocks such as a line-in controller 230, an on-net line-out controller 232, an off-net line-out controller 234, a log service 240, a job monitor 220, a network interface 250, network communication services 252, a document translator 254, a log service 240, a customer database 262, a billing database 264, and a billing controller 270.

As illustrated, the gateway 132 comprises an intermediary element between the data network 110 and the server 140 on the gateway path 154, and provides a means for interfacing between telephony protocols used on the data network 110 and the PSTN 150 and the server 140. For example, an inbound fax transmitted by one of the conventional fax machines 160 may be routed over the PSTN 150, through the gateway 134, over the data network 110, through the gateway 132, through the inbound telephone interface 212, and to the line-in controller 230 of the server 140. According to that example, a real time fax connection is provided between the fax machine 160 and the server 140, so that an inbound fax may be received by the server 140 and processed by the job monitor 220. Likewise, the gateway 132 may provide an outbound interface between the server 140 and the data network 110, when outbound faxes are transmitted from the server 140, through the gateway 132, over the data network 110, through the gateway 134, and over the PSTN 150, for delivery to one of the conventional fax machines 160. According to the outbound example, the server 140 may route the fax using the off-net line-out controller 234 and the off-net outbound telephony interface 216.

The gateway 132 includes the on-net outbound telephony interface 214 which is configured to rely on a logical crossover connection 218 between the on-net outbound telephony interface 214 and the inbound telephone interface 212. The logical crossover connection 218 may be configured via software, hardware, physical wiring, or a combination of software, hardware, and physical wiring, among examples. Using the gateway 132 and the logical crossover connection 218, outbound fax messages from the server 140 may appear to have traversed the data network 110 and/or the PSTN 150, before being received by the inbound telephone interface 212 for receipt by the line-in controller 230 of the server 140.

The elements of the server 140 are coordinated by the job monitor 220. According to aspects of the invention, the job monitor 220 coordinates a network-based fax service. As described above, the network-based fax service permits users to send and receive faxes using the data network 110 and, in some cases, without using conventional fax machines connected to the PSTN 150. The server 140 permits users to access the network-based fax service via the data network 110 and client terminals, such as the computers 112, the multiple-function device 114, and the network fax machine 116. In one embodiment, the server 140 relies upon the network interface 250 to connect to the client terminals. The network interface 250 comprises the hardware and associated software to provide a communications connection between the server 140 and the clients connected to the data network 110.

The network communication services 252 may comprise various forms of services such as a web host, an e-mail service, API connectivity services, and FTP connectivity services, for example. Using one or more of the services, the network-based fax service of the server 140 may be accessed by users of the computers 112, the multiple-function device 114, and the network fax 116. For example, using the web-host of the network communication services 252, a user may navigate to and access a web page associated with the network-based fax service of the server 140. Upon accessing the web page, a user of the computer 112 may attach an electronic document to be uploaded to the server 140 for delivery as a fax. As another example, a user of the multiple-function device 114 or the network fax machine 116 may upload an electronic document to the server 140 using the API connectivity services of the network communication services 252. As still another example, a user may send an electronic document to the server 140 as an attachment to an e-mail using the e-mail service of the network communication services 252. The examples above are not intended to be limiting in nature, and it is noted that the server 140 may receive electronic documents for distribution as faxes via any known method or means.

It is noted that, when a user, as one customer of the network-based fax service, submits an electronic document to the server 140 for distribution, the user may not be aware of whether the electronic document will be delivered to another customer of the network-based fax service. For example, when using the web-host of the network communication services 252, a user may specify a destination fax number as a destination identifier, without any knowledge of whether the destination fax number is associated with a customer that also subscribes to the network-based fax service provided by the server 140. In other words, the user may believe that the network-based fax service is going to deliver the electronic document over the PSTN 150 to a standard fax machine 160.

Upon receipt of a new electronic document to be delivered as a fax, the job monitor 220 is configured to identify whether a destination of the fax message is associated with a destination account among a known group of customer accounts that subscribe to the network-based fax service provided by the server 140. In that context, the customer database 262 may store a known group of customers that subscribe to the network-based fax service. The job monitor 220 may identify whether a destination is associated with an account among the known group of customer accounts based on a reverse lookup query and corresponding response from to the customer database 262, using a destination fax number as an index, for example. To expedite the reverse lookup query to and corresponding response from the customer database 262, the customer database may be formatted as an efficient lookup structure.

If the job monitor 220 identifies that the destination of a fax is associated with a destination account among the known group of customers, the job monitor 220 has identified that the destination of the fax message is to an account of a customer that also subscribes to the network-based fax service provided by the server 140. As used herein, a destination of an electronic message is "on-net" if the destination is associated with a customer account among the known customers that subscribe to the network-based service provided by the server 140.

When the job monitor 220 identifies that an electronic document is to be delivered "on-net," the job monitor 220 designates the electronic document for on-net delivery. If the job monitor 220 does not identify the electronic document as being associated with a destination account among the known group of customer accounts, the job monitor designates the electronic document for "off-net" delivery. In this manner, the job monitor 220 designates each incoming fax-delivery job as being either on- or off-net. As described in further detail below, the job monitor 220 routes faxes based on whether the faxes are on- or off-net, using one of the on-net line-out controller 232 and the off-net line-out controller 234 and the associated telephone interfaces 214 and 216 of the gateway 132.

The log service 240 maintains a log of all electronic documents received and transmitted by the server 140 for purposes of maintaining records. Because, as described in further detail below, an "on-net" delivery is routed using the logical crossover connection 218 and without the data network 110 and/or the PSTN 150, no record can be made of the delivery by a telephone company or other entity. As such, the log service 240 is configured to maintain a log of incoming and outgoing documents, faxes, and other associated messages and data, for future reference.

The document translator 254 is configured to translate formats of electronic documents, as received by the network communication services 252, into one or more formats suitable for transmission as fax messages. For example, the document translator 254 may convert a Microsoft Word® file or an Adobe® Portable Document Format (PDF) file to a Tagged Image File Format (TIFF) file before the job monitor 220 delivers the electronic document as a fax. The document translator 254 is configured to translate among any known document or file formats.

The billing controller 270 is configured to calculate fees associated with the delivery of outgoing and incoming faxes. As described in further detail below, the billing controller 270 is configured to calculate fees associated with delivery of electronic documents based on whether a destination account is among a known group of customers and a set of billing rules stored in the billing database 264.

Figure 3:
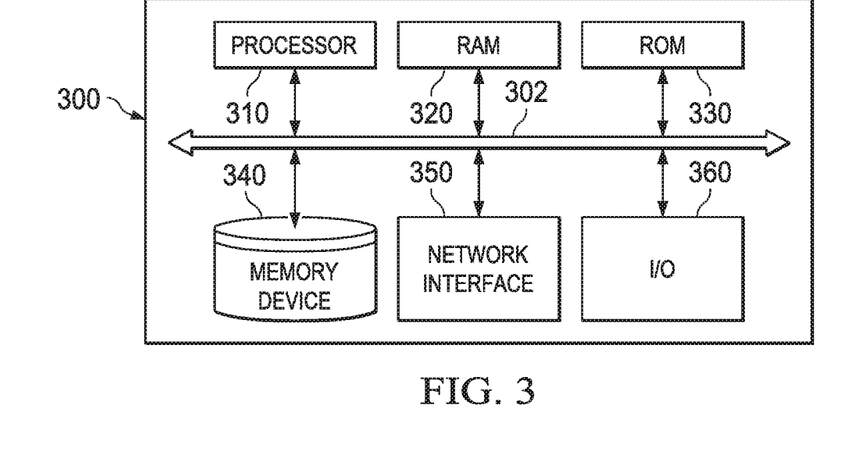
FIG. 3 illustrates an example circuit diagram of a general purpose computer.

FIG. 3 illustrates an example hardware diagram of a general purpose computer 300. Any of the computers 112, the multiple-function device 114, the network fax machine 116, the gateway 132, the gateway 134, the server 140, and the conventional fax machines 160 may be implemented using combinations of the elements of the general purpose computer 300 or several ones of the general purpose computer 300. The computer 300 includes a processor 310, a Random Access Memory (RAM) 320, a Read Only Memory (ROM) 330, a memory (i.e., storage) device 340, a network interface 350, and an Input Output (I/O) interface 360. The elements of the computer 300 are communicatively coupled via a bus 302.

The processor 310 comprises any well-known general purpose arithmetic processor. Both the RAM 320 and the ROM 330 comprise well known random access and read only memory devices, respectively, that store computer-readable instructions to be executed by the processor 310. The memory device 340 stores computer-readable instructions thereon that, when executed by the processor 310, direct the processor 310 to execute various aspects of the invention described herein. As a non-limiting example group, the memory device 340 may comprise one or more of an optical disc, a magnetic disc, a semiconductor memory (i.e., a flash based memory), a magnetic tape memory, a removable memory, combinations thereof, or any other well known memory means for storing computer-readable instructions. The I/O interface 360 comprises device input and output interfaces such as keyboard, pointing device, display, communication, and other interfaces. The bus 302 electrically and communicatively couples the processor 310, the RAM 320, the ROM 330, the memory device 340, the network interface 350, and the I/O interface 360, so that data and instructions may be communicated among the processor 310, the RAM 320, the ROM 330, the memory device 340, the network interface 350, and the I/O interface 360. In operation, the processor 310 is configured to retrieve computer-readable instructions stored on the memory device 340, the ROM 330, or another storage means, and copy the computer-readable instructions to the RAM 320 for execution. The processor 310 is further configured to execute the computer-readable instructions to implement various aspects and features of the invention described herein. For example, the processor 310 may be adapted and configured to execute one or more of the elements of the processes described below with reference to FIGS. 4 and 5.

Figure 4:
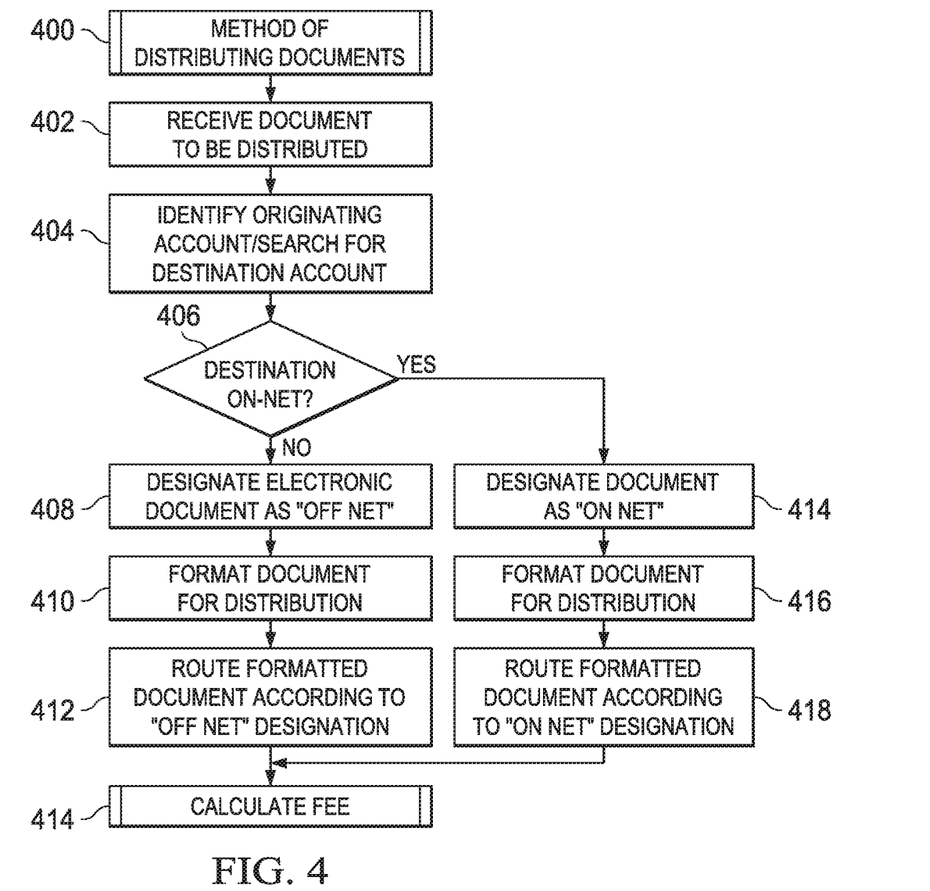
FIG. 4 illustrates an example flow diagram of a method of distributing documents according to aspects described herein.
Figure 5:
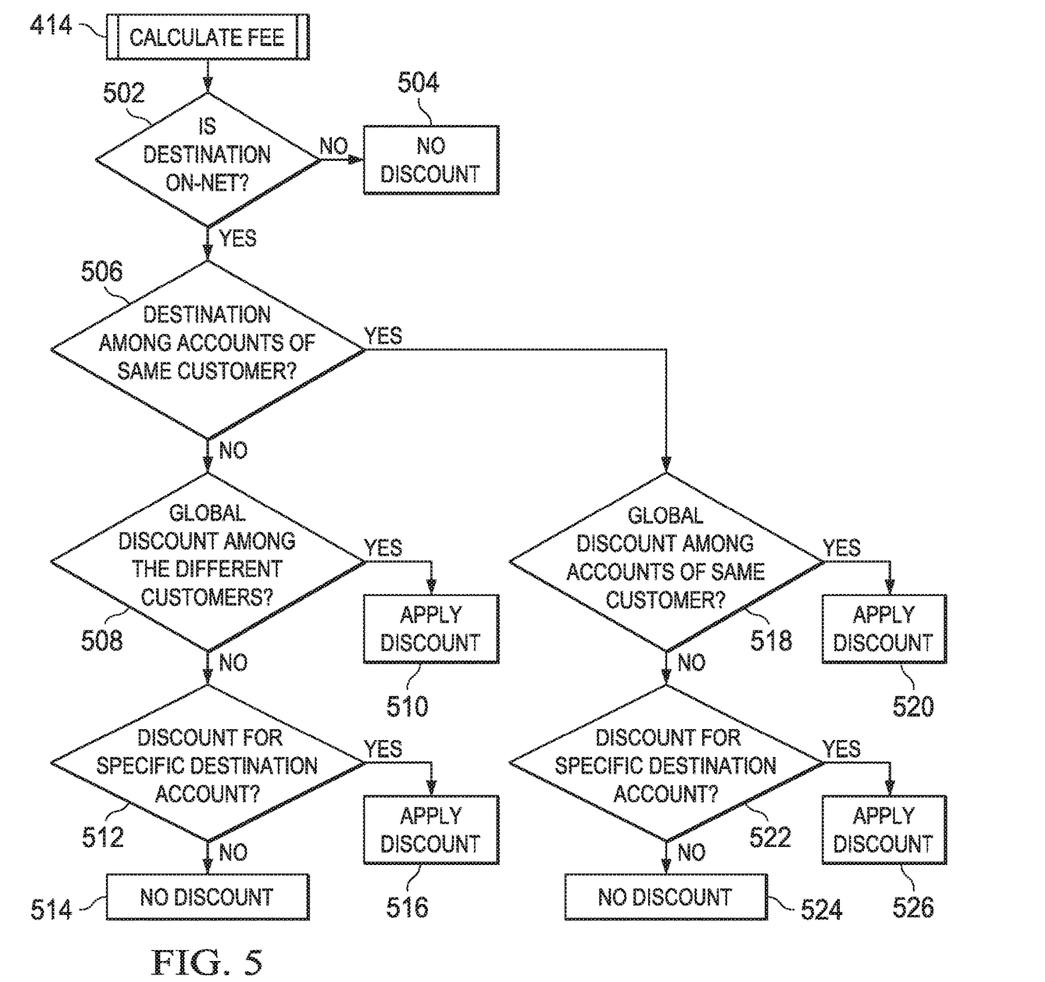
FIG. 5 illustrates an example flow diagram of a method of calculating a delivery fee according to aspects described herein.

Before turning to the process flow diagrams of FIGS. 4 and 5, it is noted that the invention may be practiced using an alternative order of the steps illustrated in FIGS. 4 and 5. That is, the process flows illustrated in FIGS. 4 and 5 are provided as examples only, and the invention may be practiced using process flows that differ from those illustrated. Additionally, it is noted that not all steps are required in every embodiment. In other words, one or more of the steps may be omitted or replaced, without departing from the spirit and scope of the invention.

Turning to FIG. 4, an example method of distributing documents 400 performed by the server 140 and the gateway 132 is described. The method of distributing documents 400 includes receiving a document to be distributed at 402, identifying originating and destination accounts at 404, designating destinations as on-net or off-net at 406, designating electronic documents as off-net at 408, formatting documents for distribution at 410, routing formatted documents according to the off-net designation at 412, and calculating fees at 414. The method of distributing documents 400 further includes designating electronic documents as on-net at 414, formatting documents for distribution at 416, and routing formatted documents according to the on-net designation at 418.

The method 400 of distributing documents includes the server 140 receiving an electronic document to be distributed as a fax at step 402. The electronic document may be received using the network communication services 252 via the network interface 250 and the direct network path 152 to the data network 110, as described above. Particularly, any of the computers 112, the multiple-function device 114, and the network fax machine 116 may transfer one or more electronic documents to the server 140 for distribution. An electronic document received at step 402 is received along with origin and destination identifiers or other similar data.

After receipt of the electronic document at step 402, the job monitor 220 identifies an originating account and searches for a destination account at step 404. For example, the job monitor 220 may rely upon a username, account number, IP address, MAC address, or other identifier associated with the received electronic document such as a fax number to identify an originating account associated with the received electronic document based on a reverse lookup query to and corresponding response from the customer database 262. A customer account of the network-based fax service may be identified as an originating account for distribution of the received electronic document, because the customer account should be charged a fee for distribution of the electronic document. Additionally, at step 404, the job monitor 220 searches among a known group of customer accounts that subscribe to the network-based fax service, to determine whether the destination identifier is associated with an account of a subscriber of the network-based fax service. To achieve this, the job monitor 220 may execute a reverse lookup query to and corresponding response from the customer database 262, as a search among a known group of customers that subscribe to the network-based fax service.

At decision step 406, depending on whether the destination of the electronic document is identified as being associated with an account of the network-based fax service, the job monitor will proceed to either step 408 or 414. When the destination of the electronic document is not identified as being associated with an account among the known group of customer accounts stored in the customer database 262, the job monitor 220 designates the electronic document for an off-net delivery at step 408. Designation of the electronic document for off-net delivery may be accomplished using metadata or other data flag stored by the server 140 in association with the electronic document to be distributed. At step 410, the document translator 254 translates a format of the received electronic document to a format suitable for transmission as a fax, such as a TIFF format. At step 412, the job monitor 220 routes the formatted electronic document according to the off-net designation. According to the off-net designation, the job monitor 220 routes the formatted electronic document to the off-net line-out controller 234 and the off-net outbound telephony interface 216 of the gateway 132, for communication of the formatted electronic document over the data network 110 and the PSTN 150. In other words, for a destination identifier not associated with a customer account among the known group of customer accounts, a fax is transmitted via the data network 110 for possible delivery to one of the conventional fax machines 160 connected to the PSTN 150. As noted above, delivery of such a fax is accompanied by a charge for delivery using the PSTN 150, according to rates determined by a telephone company or other entity that maintains the PSTN 150. At step 414, the billing controller 270 calculates a fee associated with off-net delivery of the electronic document, as described in further detail with reference to FIG. 5 below.

Alternatively, if the job monitor 220 determines at step 406 that the destination identifier of the electronic document is associated with a customer account among the known group of customer accounts stored in the customer database 262, the job monitor 220 designates the electronic document for an on-net delivery at step 414. At step 416 (as at step 410), the document translator 254 translates a format of the received electronic document to a format suitable for transmission as a fax message, such as a TIFF format At step 418, the job monitor 220 routes the on-net electronic document via the on-net line-out controller 232 and the on-net outbound telephony interface 214, so that the electronic document may be delivered via the logical cross over connection 218 to the inbound telephone interface 212 for receipt by the line-in controller 230.

In association with step 418, it is noted that the on-net line-out controller 232 may append a fax transmission header to the electronic document before and/or while the electronic document is being transmitted in real time via the on-net outbound telephony interface 214 and the logical cross over connection 218 and being received via the inbound telephony interface 212 and the line-in controller 230. In that sense, the line-in controller 230 performs some standard fax machine functions for reception of a fax in real time, while the on-net line-out controller 232 performs some standard fax machine functions for transmission of a fax in real time. The fax transmission header and other transmission data may be representative of characteristics of a fax transmission negotiated between the line-in controller 230 and the on-net line-out controller 232 during an initial handshaking sequence. The header and other associated data may include a transmission fax number, a transmission speed, a total transmission time, and a page number, among other items, for example. The on-net line-out controller 232 may also add a cover page to an outgoing fax, as part of a predefined user parameter stored in association with a user account of the network-based fax service. Because the on-net line-out controller 232 appends a fax transmission header and other transmission data to an outgoing fax, electronic documents distributed on-net appear to have been transmitted via the PSTN 150 from a conventional fax machine.

At step 414, the billing controller 270 calculates a fee associated with on-net delivery of the electronic document, as described in further detail below with reference to FIG. 5. The calculation of the fee for on-net delivery may be discounted based on the fact that the delivery was routed via the logical cross over connection 218 without the costs associated with the PSTN 150. The calculation of the fee may be further based upon a set of billing rules stored in the billing database 264 as described in further detail below with reference to FIG. 5. It is noted that, whether or not the delivery fee is discounted for the customer, the operating costs of the network-based fax service are discounted.

Turning to FIG. 5, an example method 414 of calculating a delivery fee is described in further detail. The method 414 for calculating a fee includes determining whether a destination of an outgoing fax is on- or off-net at step 502. That is, as described above, the job monitor 220 relies upon the customer database 262 and a destination identifier received along with an electronic document, to determine whether a destination of a fax is associated with a destination account among the known group of customers that subscribe to the network-based fax service. The billing controller 270 receives this information from the job monitor 220 and, if the destination of the fax is off-net, the billing controller 270 provides no discount for delivery at step 504 based on a set of billing rules stored in the billing database 264, because the delivery cannot be accommodated via the logical cross over connection 218. It is noted that the set of billing rules stored in the billing database 264 specifies no discount for delivery, whenever delivery of a fax occurs off-net using the data network 110 and the PSTN 150. Because no cost savings is available for off-net delivery of a fax using the data network 110 and the PSTN 150, no discount is generally provided by the set of billing rules.

Alternatively, when the billing controller 270 receives information from the job monitor 220 that specifies that the destination of the fax is on-net, the billing controller 270 proceeds from step 502 to step 506. The remaining examples are described with reference to on-net faxes. Here, it is again noted that, although a fax may be distributed "on-net" either a discounted or standard fee may apply based on a set of billing rules.

Figure 6A:
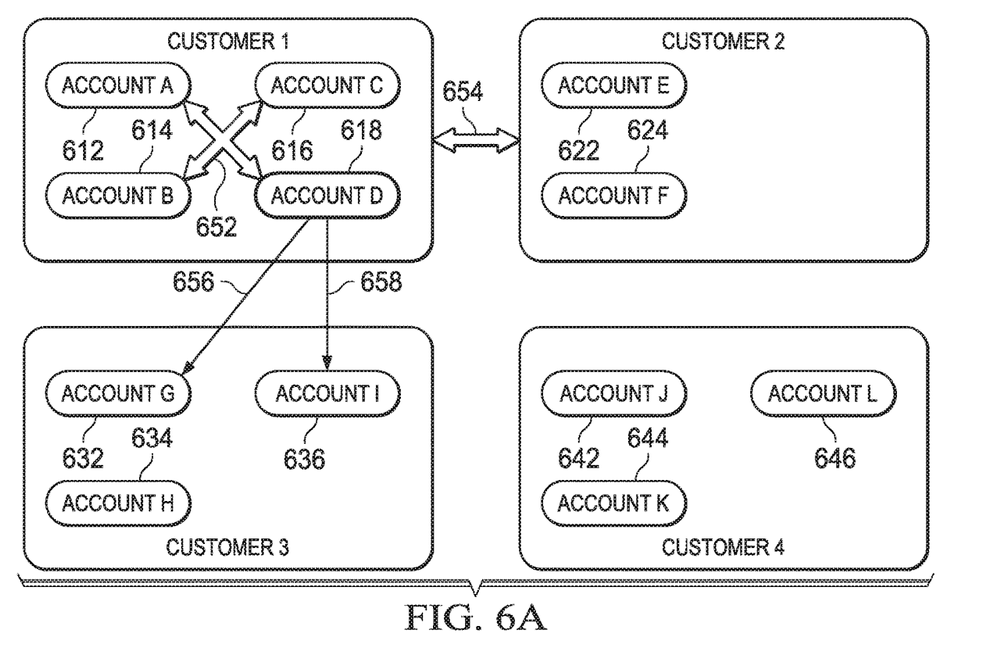
FIG. 6A illustrates an example of a set of billing rules according to aspects described herein.
Figure 6B:
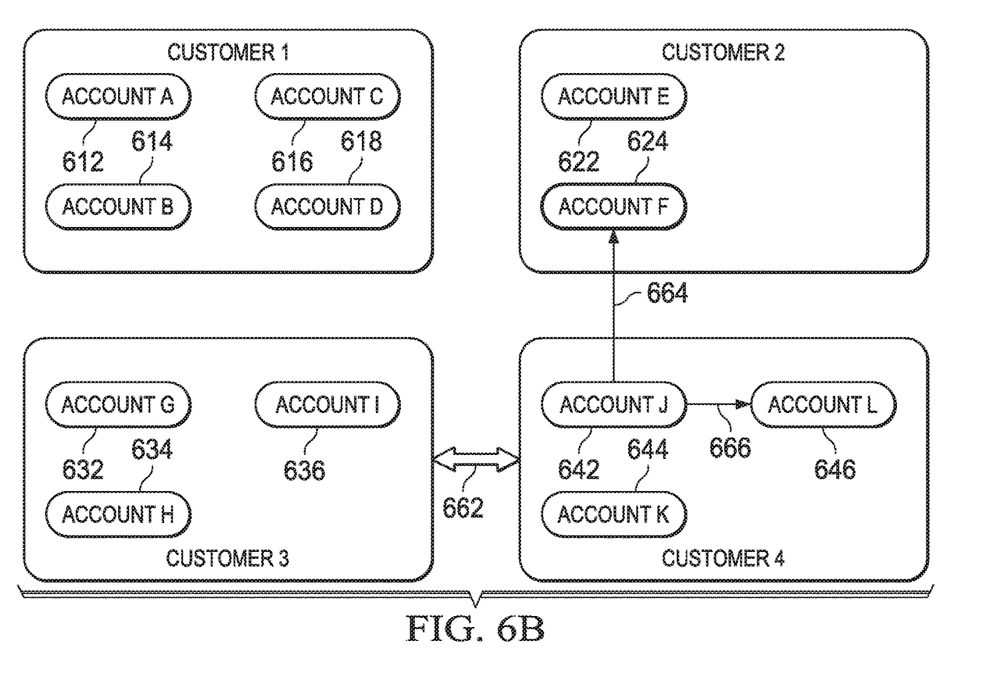
FIG. 6B illustrates another example of a set of billing rules according to aspects described herein.

To provide a more detailed example of the remaining steps of the method 414, reference is now made to FIGS. 6A and 6B. FIGS. 6A and 6B illustrate example sets of billing rules. As one example of the billing rules, the rules may be structured to define individual discount associations for each of a plurality of user accounts. In FIG. 6A, a set of billing rules associated with account D 618 of customer 1 is illustrated and, in FIG. 6B, a set of billing rules associated with account A 642 of customer 4 is illustrated. It is noted that the billing rules illustrated in FIGS. 6A and 6B are provided by way of example only, and other sets of rules are within the scope and spirit of the invention. The billing rules are relied upon by the billing controller 270 when calculating a fee for delivery of a fax. As illustrated, it is noted that one customer may include one or a plurality of accounts for purposes of billing. For example, as illustrated in FIG. 6A, customer 1 includes account A 612, account B 614, account C 616, and account D 618. Further, customer 2 includes account E 622 and account F 624; Customer 3 includes account G 632, account H 634, and account I 636; and Customer 4 includes account J 642, account K 644, and account L 646. Each customer may include any number of associated accounts, and the set of billing rules may include rules for any number of customers and associated accounts. For billing purposes, each customer may receive a single bill for network-based fax services for all of its accounts. For example, customer 1 may receive a single bill for network-based fax services associated with accounts 612, 614, 616, and 618. Alternatively, each account may be billed separately. As described in further detail below, FIG. 6A includes global discounts 652 and 654 and specific discounts 656 and 658. Also, FIG. 6B includes global discount 662 and specific discounts 664 and 666.

Referring to both FIG. 5 and FIG. 6A for one example, in the case of distributing a fax from originating account D 618 to destination account E 622, the billing controller 270 first determines that the originating and destination accounts are not accounts of a same customer at step 506, because originating account D 618 is associated with customer 1 and destination account E 622 is associated with customer 2. Based on the determination that the originating and destination accounts are not accounts of a same customer at step 506, the billing controller 270 proceeds to step 508, where the billing controller 270 determines whether a global discount 654 exists between the originating account D 618 and the destination account E 622 at step 508 based on a query to and corresponding response from the billing database 264. In the case of distributing the fax from originating account D 618 to destination account E 622, the billing controller 270 determines that the global discount 654 exists between accounts of customer 1 and accounts of customer 2. As such, the billing controller 270 determines that a discount exists between the originating account D 618, as an account of customer 1, and the destination account E 622, as an account of customer 2, at step 508, and the billing controller 270 calculates a discounted fee for delivery of the fax to the destination account E 622 at step 510.

As used herein, a global discount between customers, such as global discount 654, includes a discount between each user account of one customer and each user account of another customer. In other words, the billing rules illustrated in FIG. 6A include global discount 654, which specifies a discount between all accounts of customers 1 and 2. Once defined in the set of billing rules, the global discount 654 may also apply between accounts added in the future to either customer 1 or customer 2. The global discount 654 may be considered part of a subset of the set of billing rules illustrated in FIG. 6A because it specifies an inter-customer rule rather than intra-customer rule. That is, the set of billing rules may be defined, in part, according to inter-customer and intra-customer rules, for flexibility.

In a different example with reference to FIG. 6A when distributing a fax from originating account D 618 to destination account A 612, the billing controller 270 first determines that the originating and destination accounts are accounts of a same customer based on a query to and corresponding response from the customer database 262 at step 506, because originating account D 618 is associated with customer 1 and destination account A 612 is also associated with customer 1. Based on the determination that the originating and destination accounts are accounts of a same customer at step 506, the billing controller 270 proceeds to step 518. At step 518, the billing controller 270 determines that a global discount exists between the originating account D 618 and the destination account A 612 based on a query to and corresponding response from the billing database 264. In particular, the billing controller 270 identifies global discount 652 between the originating account D 618 and the destination account A 612. Based on the identification of the global discount 652, the billing controller 270 calculates a discounted fee associated with distribution of the fax to the destination account A 612 at step 520. In this case, the global discount 652 may be considered part of a subset of the set of billing rules illustrated in FIG. 6A, because it specifies an intra-customer rule, rather than inter-customer rule.

Referring to FIG. 5 and FIG. 6B for another example, when distributing a fax from originating account J 642 of customer 4 to destination account L 646 of customer 4, the job monitor 220 determines that account L 646 is a destination account among the known group of customers based on a query to and corresponding response from the customer database 262 at step 502. The billing controller 270 receives this information from the job monitor 220 and proceeds to step 506, to determine whether the originating account J 642 and the destination account L 646 are each associated with a same customer at step 506. At step 506, the billing controller 270 determines that the originating account J 642 and the destination account L 646 are both accounts of customer 4, based on a query to and corresponding response from the customer database 262, and proceeds to step 518. At step 518, the billing controller 270 determines that no global discount exists between the originating account J 642 and the other accounts of customer 4 based on a query to and corresponding response from the billing database 264. In contrast to the global discount 652 among the accounts of customer 1, as illustrated in FIG. 6A, no global discount exists between the accounts of customer 4, as illustrated in FIG. 6B. As such, the billing controller 270 determines that no global discount exists between originating account J 642 and the other accounts of customer 4 at step 518.

Based on the determination that no global discount exists between the originating account J 642 and the destination account L 646 at step 518, the billing controller 270 proceeds to step 522, where the billing controller 270 determines whether a specific discount exists between the originating account J 642 and the destination account L 646 based on a query to and corresponding response from the billing database 264. At step 522, the billing controller 270 identifies the specific discount 666 between the originating account J 642 and the destination account L 646. Based on the determination that the specific discount 666 exists between the originating account J 642 and the destination account L 646 at step 522, the billing controller 270 calculates a discounted fee for delivery of the fax to the destination account L 646 at step 526. In this case, the specific discount 666 may be considered part of a subset of the set of billing rules illustrated in FIG. 6B, because it specifies an intra-customer rule rather than inter-customer rule.

In another example with reference to FIG. 6B, when distributing a fax from the originating account J 642 to destination account K 644, the billing controller 270 determines that no global discount exists between originating account J 642 and destination account K 644 at step 518 based on a query to and corresponding response from the billing database 264. Again, it is noted that no global discount exists among the accounts of customer 4. Based on the determination that no global discount exists between the originating account J 642 and the destination account K 644 at step 518, the billing controller 270 proceeds to step 522, where the billing controller 270 determines whether a specific discount exists between originating account J 642 and destination account K 644 based on a query to and corresponding response from the billing database 264. At step 522, the billing controller 270 identifies that no specific discount exists between the originating account J 642 and the destination account K 644. Based on the determination that no specific discount exists between the originating account J 642 and the destination account K 644 at step 522, the billing controller 270 calculates a standard fee for delivery of the fax to the destination account K 644 at step 524.

In another example with reference to FIG. 6B, when distributing a fax from originating account J 642 of customer 4 to destination account F 624 of customer 2, the job monitor 220 determines that account F 624 is a destination account among the known group of customers based on a query to and corresponding response from the customer database 262 at step 502. The billing controller 270 then proceeds to step 506, to determine whether the originating account J 642 and the destination account F 624 are each associated with a same customer at step 506. At step 506, the billing controller 270 determines that the originating account J 642 and the destination account L 646 are not both accounts of customer 4, based on a query to and corresponding response from the customer database 262, and proceeds to step 508. At step 508, the billing controller 270 determines that no global discount exists between the originating account J 642 and the accounts of customer 2 based on a query to and corresponding response from the billing database 264. In contrast to the global discount 654 among the accounts of customers 1 and 2, as illustrated in FIG. 6A, no global discount exists between the accounts of customers 4 and 2, as illustrated in FIG. 6B. As such, the billing controller 270 determines that no global discount exists between originating account J 642 and the accounts of customer 2 at step 508.

Based on the determination that no global discount exists between the originating account J 642 and the accounts of customer 2 at step 508, the billing controller 270 proceeds to step 512, where the billing controller 270 determines whether a specific discount exists between the originating account J 642 and the destination account F 624 based on a query to and corresponding response from the billing database 264. At step 512, the billing controller 270 identifies the specific discount 664 between the originating account J 642 and the destination account F 624. Based on the determination that the specific discount 664 exists between the originating account J 642 and the destination account F 624 at step 512, the billing controller 270 calculates a discounted fee for delivery of the fax to the destination account F 624 at step 516. In this case, the specific discount 664 may be considered part of a subset of the set of billing rules illustrated in FIG. 6B, because it specifies an inter-customer rule rather than intra-customer rule.

It is also noted that the specific discount between account J 642, as an originating account, and account F 624, as a destination account, may or may not define a specific discount between account F 624, as an originating account, and account J 642, as a destination account. In other words, the billing rules may define specific discounts between accounts as either one-way or two-way, for flexibility.

In another example with reference to FIG. 6B, when distributing a fax from the originating account J 642 to destination account E 622, the billing controller 270 determines that no global discount exists between originating account J 642 and destination account E 622 at step 508 based on a query to and corresponding response from the billing database 264. Again, it is noted that no global discount exists among the accounts of customers 4 and 2. Based on the determination that no global discount exists between the originating account J 642 and the destination account E 622 at step 508, the billing controller 270 proceeds to step 512, where the billing controller 270 determines whether a specific discount exists between originating account J 642 and the destination account E 622 based on a query to and corresponding response from the billing database 264. At step 512, the billing controller 270 identifies that no specific discount exists between the originating account J 642 and the destination account E 622. Based on the determination that no specific discount exists between the originating account J 642 and the destination account E 622 at step 522, the billing controller 270 calculates a standard fee for delivery of the fax to the destination account E 622 at step 514.

It is noted that calculation of a delivery fee by the billing controller 270 at steps 510, 520, 516, and 526 may be based on various parameters in addition to discounts specified by the set of billing rules, such as the transmission time of the fax, the number of pages of the fax, and predetermined rates for fax distribution, among other parameters. Similarly, calculation of a delivery fee by the billing controller 270 at steps 504, 514, and 524 may be based on various parameters such as the transmission time of the fax, the number of pages of the fax, and predetermined rates for fax distribution, among other parameters.

The global and specific discounts of the billing rules may be defined based on a plurality of considerations, such as customer relationships and customer inter-relationships. For example, a global discount may be provided among all accounts of one customer having a certain number of transactions per period of time or based on another promotion. As another example, a global discount may be provided between two customers that are subsidiaries, as part of a negotiated rate. In other aspects, because a discount may indicate to one customer that another customer is serviced by the same network-based fax service, no global or specific discounts may be defined between customers that are competitors.

Variations on the billing rules illustrated in FIGS. 6A and 6B are within the scope and spirit of the invention. As an alternative to the detailed billing rules illustrated in FIGS. 6A and 6B, in one embodiment, the set of billing rules may specify a discounted fee for routing a fax to each of a known group of customer accounts. In other words, the set of billing rules may simply specify a reduced fee for delivery of every fax identified as having an on-net destination at step 502. In another embodiment, the set of billing rules may specify a discounted fee for routing a fax to a first group of the known group of customer accounts and specify a standard fee for a second group of the known group of customer accounts.

It is again noted that, as between faxes delivered on- and off-net, the network-based fax service described herein is configured to deliver faxes on-net without providing any indication of on-net delivery. In other words, a fax delivered on-net will appear the same as a fax delivered off-net, because delivery via the logical crossover connection 218 cannot be distinguished from delivery via the data network 110 and/or the PSTN 150. Thus, where the set of billing rules defines a standard fee, the network-based fax service saves costs while maintaining privacy between customers, such as competing customers.

Although embodiments of the invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the invention defined in the following claims, the scope of which are to be accorded the broadest interpretation so as to encompass modifications and equivalent structures.

What is claimed is:

1. A method for electronic document distribution, comprising:
   receiving, by a server computer communicatively connected to a data network and to a gateway device, an electronic document from a client device over the data network or the gateway device, the gateway device having an inbound interface, an on-net outbound interface, an off-net outbound interface, and a port embodying a crossover connection between the inbound interface and the on-net outbound interface;
   determining, by the server computer, whether a destination associated with the electronic document is associated with a network-based fax service provided by the server computer, the determining including querying a database using an identifier associated with the electronic document, wherein responsive to an entry being found in the database using the identifier associated with the electronic document, the electronic document is determined to be associated with the network-based fax service provided by the server computer;
   designating, by the server computer, the electronic document for on-net delivery responsive to the electronic document being associated with the network-based fax service provided by the server computer, or for off-net delivery responsive to the electronic document not being associated with the network-based fax service provided by the server computer; and
   routing, by the server computer, the electronic document to the on-net outbound interface of the gateway device responsive to the electronic document being designated for on-net delivery, or to the off-net outbound interface of the gateway device responsive to the electronic document being designated for off-net delivery, wherein the on-net delivery of the electronic document is routed from the server computer by way of the on-net outbound interface of the gateway device through the crossover connection to the inbound interface of the gateway device.

2. The method according to claim 1, further comprising:
   while the electronic document is being transmitted in real time from an on-net line-out controller of the server computer by way of the on-net outbound interface of the gateway device through the crossover connection and being received through the inbound interface of the gateway device by an line-in controller of the server computer, appending a fax transmission header to the electronic document based on transmission data representative of characteristics of a fax transmission negotiated between the on-net line-out controller of the server computer and the line-in controller of the server computer during an initial handshaking sequence.

3. The method according to claim 2, further comprising:
   in addition to appending the fax transmission header to the electronic document, adding a coverage page to the electronic document.

4. The method according to claim 1, further comprising:
   prior to routing the electronic document to the on-net outbound interface of the gateway device, appending a fax transmission header to the electronic document.

5. The method according to claim 1, further comprising:
   prior to routing the electronic document to the on-net outbound interface of the gateway device or to the off-net outbound interface of the gateway device, translating the electronic document from a first format to a second format.

6. The method according to claim 1, wherein the identifier associated with the electronic document comprises a username, an account number, an Internet Protocol (IP) address, a media access control (MAC) address, or a destination fax number.

7. The method according to claim 1, wherein querying the database using an identifier associated with the electronic document further comprises performing a reverse lookup on the database using the identifier and wherein the database is formatted as an efficient lookup structure.

8. A system for electronic document distribution, comprising:
   a server computer communicatively connected to a data network, the server computer having a processor, a non-transitory computer-readable medium, and stored instructions; and
   a gateway device communicatively connected to the server computer and to the data network, the gateway device having an inbound interface, an on-net outbound interface, an off-net outbound interface, and a port embodying a crossover connection between the inbound interface and the on-net outbound interface;
   wherein the stored instructions when translated by the processor of the server computer perform:
      receiving an electronic document from a client device over the data network or the gateway device;
      determining whether a destination associated with the electronic document is associated with a network-based fax service provided by the server computer, the determining including querying a database using an identifier associated with the electronic document, wherein responsive to an entry being found in the database using the identifier associated with the electronic document, the electronic document is determined to be associated with the network-based fax service provided by the server computer;
      designating the electronic document for on-net delivery responsive to the electronic document being associated with the network-based fax service provided by the server computer, or for off-net delivery responsive to the electronic document not being associated with the network-based fax service provided by the server computer; and routing the electronic document to the on-net outbound interface of the gateway device responsive to the electronic document being designated for on-net delivery, or to the off-net outbound interface of the gateway device responsive to the electronic document being designated for off-net delivery, wherein the on-net delivery of the electronic document is routed from the server computer by way of the on-net outbound interface of the gateway device through the crossover connection to the inbound interface of the gateway device.

9. The system of claim 8, wherein the server computer further comprises an on-net line-out controller and an line-in controller and wherein the stored instructions when translated by the processor of the server computer further perform:

while the electronic document is being transmitted in real time from the on-net line-out controller of the server computer by way of the on-net outbound interface of the gateway device through the crossover connection and being received through the inbound interface of the gateway device by the line-in controller of the server computer, appending a fax transmission header to the electronic document based on transmission data representative of characteristics of a fax transmission negotiated between the on-net line-out controller of the server computer and the line-in controller of the server computer during an initial handshaking sequence.

10. The system of claim 9, wherein the stored instructions when translated by the processor of the server computer further perform:

in addition to appending the fax transmission header to the electronic document, adding a coverage page to the electronic document.

11. The system of claim 8, wherein the stored instructions when translated by the processor of the server computer further perform:

prior to routing the electronic document to the on-net outbound interface of the gateway device, appending a fax transmission header to the electronic document.

12. The system of claim 8, wherein the stored instructions when translated by the processor of the server computer further perform:

prior to routing the electronic document to the on-net outbound interface of the gateway device or to the off-net outbound interface of the gateway device, translating the electronic document from a first format to a second format.

13. The system of claim 8, wherein the identifier associated with the electronic document comprises a username, an account number, an Internet Protocol (IP) address, a media access control (MAC) address, or a destination fax number.

14. The system of claim 8, wherein querying the database using an identifier associated with the electronic document further comprises performing a reverse lookup on the database using the identifier and wherein the database is formatted as an efficient lookup structure.

15. A computer program product for electronic document distribution, the computer program product comprising a non-transitory computer-readable medium storing instructions translatable by a server computer communicatively connected to a data network and to a gateway device, the gateway device having an inbound interface, an on-net outbound interface, an off-net outbound interface, and a port embodying a crossover connection between the inbound interface and the on-net outbound interface, the instructions when translated by the server computer perform:

receiving an electronic document from a client device over the data network or the gateway device;

determining whether a destination associated with the electronic document is associated with a network-based fax service provided by the server computer, the determining including querying a database using an identifier associated with the electronic document, wherein responsive to an entry being found in the database using the identifier associated with the electronic document, the electronic document is determined to be associated with the network-based fax service provided by the server computer;

designating the electronic document for on-net delivery responsive to the electronic document being associated with the network-based fax service provided by the server computer, or for off-net delivery responsive to the electronic document not being associated with the network-based fax service provided by the server computer; and routing the electronic document to the on-net outbound interface of the gateway device responsive to the electronic document being designated for on-net delivery, or to the off-net outbound interface of the gateway device responsive to the electronic document being designated for off-net delivery, wherein the on-net delivery of the electronic document is routed from the server computer by way of the on-net outbound interface of the gateway device through the crossover connection to the inbound interface of the gateway device.

16. The computer program product of claim 15, wherein the instructions when translated by the server computer further perform:

while the electronic document is being transmitted in real time from an on-net line-out controller of the server computer by way of the on-net outbound interface of the gateway device through the crossover connection and being received through the inbound interface of the gateway device by an line-in controller of the server computer, appending a fax transmission header to the electronic document based on transmission data representative of characteristics of a fax transmission negotiated between the on-net line-out controller of the server computer and the line-in controller of the server computer during an initial handshaking sequence.

17. The computer program product of claim 16, wherein the instructions when translated by the server computer further perform:

in addition to appending the fax transmission header to the electronic document, adding a coverage page to the electronic document.

18. The computer program product of claim 15, wherein the instructions when translated by the server computer further perform:

prior to routing the electronic document to the on-net outbound interface of the gateway device, appending a fax transmission header to the electronic document.

19. The computer program product of claim 15, wherein the instructions when translated by the server computer further perform:

prior to routing the electronic document to the on-net outbound interface of the gateway device or to the off-net outbound interface of the gateway device, translating the electronic document from a first format to a second format.

20. The computer program product of claim 15, wherein the identifier associated with the electronic document comprises a username, an account number, an Internet Protocol (IP) address, a media access control (MAC) address, or a destination fax number.

21. The computer program product of claim 15, wherein querying the database using an identifier associated with the electronic document further comprises performing a reverse lookup on the database using the identifier and wherein the database is formatted as an efficient lookup structure.

* * * * *

UNITED STATES PATENT AND TRADEMARK OFFICE
CERTIFICATE OF CORRECTION

PATENT NO. : 10,694,067 B2  
APPLICATION NO. : 15/830594  
DATED : June 23, 2020  
INVENTOR(S) : Francis Toscano and Samuel N. Kamens Page 1 of 1

It is certified that error appears in the above-identified patent and that said Letters Patent is hereby corrected as shown below:

In the Specification

Column 7, Line 13, replace "telephone" with "telephony"

Column 7, Line 31, replace "telephone" with "telephony"

Column 7, Line 49, replace "telephone" with "telephony"

Column 7, Line 57, replace "telephone" with "telephony"

Column 9, Line 16, replace "telephone" to "telephony"

Column 11, Line 61, replace "telephone" to "telephony"

Signed and Sealed this  
Twenty-second Day of June, 2021

Drew Hirshfeld  
*Performing the Functions and Duties of the  
Under Secretary of Commerce for Intellectual Property and  
Director of the United States Patent and Trademark Office*